United States Patent
Eisele et al.

(10) Patent No.: US 12,084,029 B2
(45) Date of Patent: Sep. 10, 2024

(54) METHOD FOR OPERATING AN ANTILOCK BRAKE SYSTEM OF A VEHICLE AND CORRESPONDING ANTILOCK BRAKE SYSTEM

(71) Applicant: Robert Bosch GmbH, Stuttgart (DE)

(72) Inventors: Achim Eisele, Hessigheim (DE); Andreas Klug, Untergruppenbach (DE); Jan Becker, Backnang (DE); Matthias Kranich, Grossbottwar (DE); Philipp Weingart, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 329 days.

(21) Appl. No.: 17/620,393

(22) PCT Filed: May 7, 2020

(86) PCT No.: PCT/EP2020/062664
§ 371 (c)(1),
(2) Date: Dec. 17, 2021

(87) PCT Pub. No.: WO2021/008750
PCT Pub. Date: Jan. 21, 2021

(65) Prior Publication Data
US 2022/0274570 A1 Sep. 1, 2022

(30) Foreign Application Priority Data
Jul. 12, 2019 (DE) ...................... 10 2019 210 330.8

(51) Int. Cl.
*B60T 8/1761* (2006.01)
(52) U.S. Cl.
CPC ....... *B60T 8/17616* (2013.01); *B60T 2240/00* (2013.01); *B60T 2240/02* (2013.01); *B60T 2270/10* (2013.01)

(58) Field of Classification Search
CPC ............. B60T 8/17616; B60T 2240/00; B60T 2240/02; B60T 2270/10
See application file for complete search history.

(56) References Cited

U.S. PATENT DOCUMENTS 4,901,239 A * 2/1990 Yoshino .............. B60T 8/17616
303/DIG. 5
4,923,255 A * 5/1990 Braschel ............. B60T 8/17636
303/158

FOREIGN PATENT DOCUMENTS

| EP | 177817 A1 | 4/1986 |
| EP | 291978 A2 | 11/1988 |

(Continued)

OTHER PUBLICATIONS

International Search Report for PCT/EP2020/062664, Issued Jul. 24, 2020.

*Primary Examiner* — Andrew J Cromer
(74) *Attorney, Agent, or Firm* — NORTON ROSE FULBRIGHT US LLP; Gerard A. Messina

(57) ABSTRACT

A method for operating an antilock brake system of a vehicle, in which a braking torque at at least one wheel of the vehicle is cyclically controlled in at least build-up phases and reduction phases, in order to prevent locking of the wheel. In a build-up phase, the braking torque is increased until a maximum adhesion at the wheel is exceeded, and in a subsequent reduction phase, the braking torque is reduced by a differential braking torque, which is ascertained, using a wheel acceleration value of the wheel measured after the build-up phase and a target acceleration value for the wheel.

9 Claims, 1 Drawing Sheet

(56) References Cited

FOREIGN PATENT DOCUMENTS

| | | | |
|---|---|---|---|
| EP | 572808 | A2 | 12/1993 |
| EP | 658462 | A1 | 6/1995 |
| JP | H10315953 | A | 12/1998 |

* cited by examiner

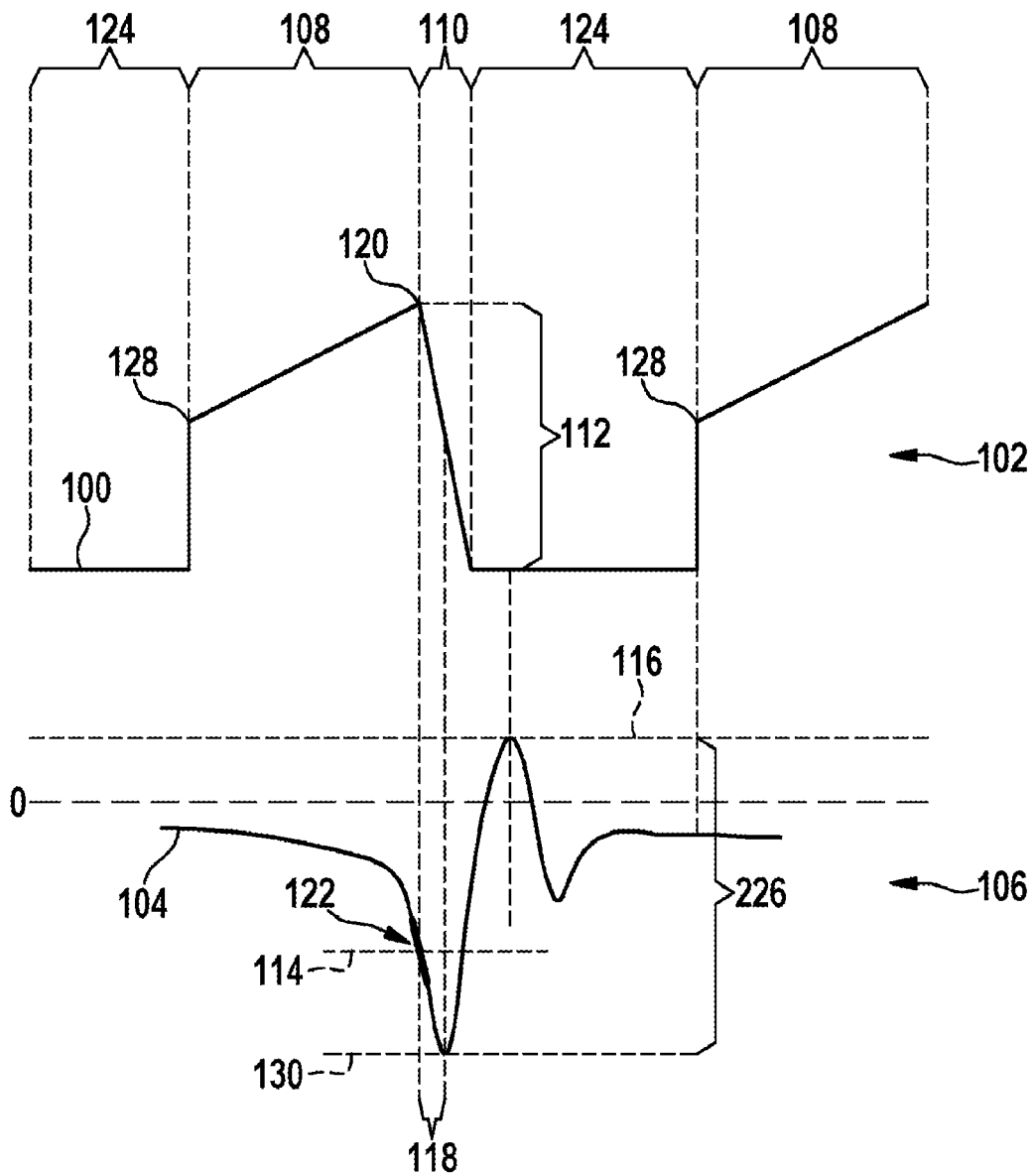

METHOD FOR OPERATING AN ANTILOCK BRAKE SYSTEM OF A VEHICLE AND CORRESPONDING ANTILOCK BRAKE SYSTEM

FIELD

The present invention relates to a method for operating an antilock brake system of a vehicle, as well as to a corresponding antilock brake system.

BACKGROUND INFORMATION

In a braking action by an antilock brake system, continuous locking of the wheels of a vehicle in response to reduced adhesion is prevented, by increasing and decreasing a brake torque again at wheels of the vehicle in a cyclical manner. In this context, the braking torque per wheel is reduced, in each instance, to a braking torque predefined and/or applied vehicle-specifically, after the wheel starts to lock. This stipulated braking torque is so low, that the wheel starts to rotate again in all possible situations. The braking torque is increased again from this stipulated value, until the wheel starts to lock again. Between the reduction and the re-increasing, the braking torque may be kept constant at the predefined braking torque for a retention period, in order to give the wheel time to stabilize.

SUMMARY

In accordance with the present invention, a method for operating a vehicle, a corresponding antilock brake system, and, finally, a corresponding computer program product and a machine-readable storage medium, are provided. Advantageous refinements and improvements of the present invention may be derived from the disclosure herein.

Specific example embodiments of the present invention may advantageously allow an overly sharp reduction in the braking torque to be prevented, by calculating, in each cycle, the level, to which the braking torque should be decreased, using a single variable measured on the wheel prior to the reduction. Consequently, when the braking torque is subsequently increased, a high level of braking action may be reached again more rapidly.

In accordance with an example embodiment of the present invention, a method for operating a vehicle is provided, in which a braking torque at at least one wheel of the vehicle is cyclically controlled in at least build-up phases and reduction phases, in order to prevent locking of the wheel; in a build-up phase, the braking torque being increased until a maximum adhesion at the wheel is exceeded, and in a subsequent reduction phase, the braking torque being reduced by a differential braking torque, which is ascertained, using a wheel acceleration value of the wheel measured after the build-up phase and a target acceleration value for the wheel.

Ideas for specific embodiments of the present invention may be regarded as based on, inter alia, the concepts and knowledge described in the following.

A braking torque may be understood as a torque counteracting an angular motion of a wheel. The braking torque may be generated by a brake system of the vehicle. For example, the braking torque may be generated by a hydraulic brake of the brake system coupled to the wheel. In the case of the hydraulic brake, a set brake pressure may be proportional to the braking torque. The braking torque may be generated by a drive system of the vehicle, as well. For example, the braking torque may be generated by an electric motor of the drive system coupled to the wheel. The electric motor may be controlled specifically to generate the braking torque.

Slip between a tire of the wheel and a surface underneath the tire is generated by the braking torque. In a build-up phase, the braking torque is increased in a ramp-shaped manner. Consequently, the slip increases, as well. For example, the braking torque is raised in a linearly increasing manner. The braking torque may be increased, starting from a minimum torque. A maximum adhesion may be attained, when the slip reaches a critical value. When the maximum adhesion is exceeded, the slip may increase superproportionally or exponentially, that is, the adhesion may decrease superproportionally or exponentially. At the maximum adhesion, a maximum braking force may be transmitted from the tire to the ground. When the maximum adhesion is exceeded, the wheel may begin to lock, since the braking torque may no longer be transmitted completely to the ground.

In order to end the locking, the wheel may be accelerated again. The wheel may be accelerated again, if the braking torque is less than the torque currently transmittable by the ground to the wheel. In a reduction phase, the braking torque may be decreased rapidly. The braking torque may be reduced by a differential braking torque to a lower braking torque. For example, in the hydraulic brake, the brake pressure may be reduced by opening an exhaust valve, until the lower braking torque is applied to the wheel. In the case of the braking torque provided by the drive system, the reduced braking torque may be controlled directly. The differential braking torque may also be approximately as large as the previous braking torque. The braking torque may then be reduced so far, that no more torque is applied to the wheel. For example, the exhaust valve may be opened completely, or the control of the braking torque may be interrupted. The differential braking torque may also be greater than the braking torque. Then, the braking torque may be offset and/or overcompensated for by a drive torque acting in opposition to the braking torque. The wheel may be actively accelerated by the drive torque.

A wheel acceleration value may represent a current angular acceleration of the wheel as a numerical value. The angular acceleration may be derived from a rotational speed of the wheel. The rotational speed may be measured by a sensor on the wheel. A target acceleration value may be a predefined numerical value. The target acceleration value may be preset for the vehicle. The target acceleration value may be referred to as an application parameter. Using the approach put forward here, the braking torque may be controlled, using the one application parameter. The differential braking torque in the reduction phase may be calculated from the measured wheel acceleration value and the target acceleration value.

A minimum value of a wheel acceleration characteristic of the wheel acquired after the build-up phase may be used as a wheel acceleration value. A wheel acceleration characteristic represents a time characteristic of the acceleration of the wheel. The wheel acceleration characteristic includes a plurality of values. Due to a moment of inertia of the wheel and the parts rotating with the wheel, the angular acceleration may also decrease after the end of the build-up phase, until the wheel is accelerated again. A minimum value indicates a turning point between decreasing angular acceleration and increasing angular acceleration. A high degree of accuracy may be attained by using the minimum value for calculating the differential braking torque.

Alternatively, the wheel acceleration value may be measured a time step after a triggering time of the reduction phase. It may take a time step, until the measure and/or measures of the reduction phase have an effect on the wheel. The wheel may be re-accelerated slightly offset in time from the triggering time. Up to that point, the wheel may continue to become slower. A time step may be predetermined, inter alia, by an idle time of the antilock brake system.

The exceedance of the maximum adhesion may be detected, when a wheel acceleration gradient of the wheel is less than a limiting gradient for the wheel. A wheel acceleration gradient may be derived from the angular acceleration of the wheel. The wheel acceleration gradient indicates a slope of the wheel acceleration characteristic. During the braking of the wheel, the wheel acceleration gradient may be negative. Thus, when the maximum adhesion is exceeded, the magnitude of the negative wheel acceleration gradient of the wheel may be greater than a magnitude of the likewise negative limiting gradient for this wheel. The wheel acceleration gradient may be monitored in a simple manner.

The braking torque may be held constant in a plateau phase following a reduction phase, up to the next build-up phase. The wheel acceleration characteristic may be acquired at least during the plateau phase. A factor for the target acceleration value for ascertaining the next differential braking torque may be increased, when a maximum of the wheel acceleration characteristic is less than the target acceleration value, and consequently, the differential wheel acceleration is not attained. By increasing the factor, the differential braking torque may become larger in the next reduction phase, which means that a more marked reduction in braking torque occurs. Due to the more marked reduction in the braking torque, the wheel is accelerated more sharply. Conversely, the factor for the target acceleration value for ascertaining the next differential braking torque may be reduced, if the maximum of the wheel acceleration characteristic is greater than the target acceleration value by more than a tolerance range and the differential wheel acceleration is therefore exceeded. By decreasing the factor, the differential braking torque becomes smaller in the next reduction phase. A weaker reduction in braking torque results due to the smaller differential braking torque. Owing to the weaker reduction in the braking torque, the wheel is accelerated less sharply. The factor of the target acceleration value may be adjusted from cycle to cycle.

In order to ascertain the next differential braking torque, the factor for the target acceleration value may be increased, if the wheel acceleration value at the end of the plateau phase is greater than the wheel acceleration value at the end of the preceding build-up phase by less than a differential wheel acceleration. By increasing the factor, the differential braking torque may become larger in the next reduction phase, which means that a more marked reduction in braking torque occurs. Due to the more marked reduction in the braking torque, the wheel is accelerated more sharply. Conversely, in order to ascertain the next differential braking torque, the factor of the target acceleration value may be reduced, if the wheel acceleration value at the end of the plateau phase is greater than the wheel acceleration value at the end of the preceding phase by more than a wheel acceleration tolerance. By decreasing the factor, the differential braking torque becomes smaller in the next reduction phase. A weaker reduction in braking torque results due to the smaller differential braking torque. Owing to the weaker reduction in the braking torque, the wheel is accelerated less sharply. The factor of the target acceleration value may be adjusted from cycle to cycle.

The example method(s) of the present invention may be implemented, for example, as software or hardware or as a mixture of software and hardware, in, for example, a control unit.

The present invention also provides an antilock brake system, which is configured to perform, control and/or implement, in corresponding devices, the steps of a variant of the method put forward here.

The antilock brake system may be an electrical device including at least one processing unit for processing signals or data, at least one storage unit for storing signals or data, and at least one interface and/or a communications interface for reading in or outputting data, which are embedded in a communications protocol. The processing unit may be, for example, a signal processor, a so-called system ASIC or a microcontroller for processing sensor signals and outputting data signals as a function of the sensor signals. The storage unit may be, for example, a flash memory, an EPROM or a magnetic storage unit. The interface may take the form of a sensor interface for inputting the sensor signals from a sensor, and/or an actuator interface for outputting the data signals and/or control signals to an actuator. The communications interface may be configured to read in or output the data wirelessly and/or by wire. The interfaces may also be software modules that are present, for example, in a microcontroller, next to other software modules.

Additionally advantageous, is a computer program product or computer program including program code, which may be stored in a machine-readable carrier or storage medium, such as a solid state memory, a hard disk storage device or an optical storage device, and is used for performing, implementing and/or controlling the steps of the method according to one of the above-described specific embodiments of the present invention, in particular, when the program product or program is executed on a computer or a device.

It is emphasized that some of the possible features and advantages of the present invention are described here with reference to different specific embodiments. It is apparent to one skilled in the art, in view of the disclosure herein, that the features of the antilock brake system and of the method may be combined, adapted or exchanged in a suitable manner, in order to arrive at further specific embodiments of the present invention.

BRIEF DESCRIPTION OF THE DRAWING

In the following, specific embodiments of the present invention are described with reference to the figures, in which case neither the figures, nor the description are to be interpreted as limiting to the present invention.

FIG. 1 shows a representation of characteristics of a braking torque and of a wheel acceleration according to an exemplary embodiment of the present invention.

The FIGURE is merely schematic and is not true to scale. In the FIGURE, identical reference numerals denote like features or features functioning in the same manner.

DETAILED DESCRIPTION OF EXAMPLE EMBODIMENTS

FIG. 1 shows a braking torque characteristic 100 of a braking torque 102 at a wheel of a vehicle, and a wheel acceleration characteristic 104 of a wheel acceleration 106 of the wheel. Braking torque characteristic 100 and wheel acceleration characteristic 104 are shown during a control action of an antilock brake system according to an exemplary embodiment, for preventing locking of the wheel. Braking torque 102 is cyclically increased in build-up phases 108 and lowered in reduction phases 110. In this context, braking torque 102 is increased in build-up phases 108, until the wheel exceeds a maximum adhesion and starts to lock. In reduction phases 110, braking torque 102 is reduced, in each instance, by a differential braking torque 112, so that the wheel is re-accelerated due to a residual adhesion to the ground.

The differential braking torque 112 to be controlled is calculated for each subsequent reduction phase 110, using a wheel acceleration value 114 measured after the specific build-up phase 108. To that end, wheel acceleration 106 is measured after build-up phase 108 and reflected in wheel acceleration value 114. Wheel acceleration value 114 and a vehicle-specific target acceleration value 116 are substituted with other fixed vehicle parameters into a processing specification, and differential braking torque 112 is calculated. In this context, target acceleration value 116 represents a desired re-acceleration of the wheel after the start of the locking.

In one exemplary embodiment, wheel acceleration characteristic 104 is monitored after the end of build-up phase 108. Due to an inertia of the wheel, wheel acceleration 106 reacts to the reduction of braking torque 102 in a delayed manner. In this context, a minimum wheel acceleration value 130 of wheel acceleration characteristic 104 is used as the wheel acceleration value.

Since the inertia of the wheel is known, wheel acceleration value 114 may alternatively be measured a time step 118 after a triggering time 120 of reduction phase 110. Reduction phase 110 may be triggered, for example, when an acceleration gradient 122 of wheel acceleration 106 is less than a limiting gradient.

In one exemplary embodiment, braking torque 102 is held constant after reduction phase 110, for a plateau phase 124, until next build-up phase 108 begins. The wheel stabilizes in plateau phase 122. In plateau phase 124, it is checked if wheel acceleration 106 increases sharply enough to reach target acceleration value 116. If target acceleration value 116 is not attained or is exceeded, then, in one exemplary embodiment, a factor in the processing specification is adjusted to calculate differential braking torque 112. If target acceleration value 116 is not reached, that is, the wheel is not accelerated sharply enough, the factor is adjusted in such a manner, that for the next reduction phase 110, a greater differential torque 112 is calculated in the case of a wheel acceleration value 114 measured in the same manner. Conversely, if target acceleration value 116 is exceeded by more than a tolerance, the factor is adjusted in such a manner, that for the next reduction phase 110, a smaller differential braking torque 112 is calculated in the case of a wheel acceleration value 114 measured in the same manner.

In one exemplary embodiment, wheel acceleration value 114 is compared to attained wheel acceleration value 130 at the end of build-up phase 108 and a time step 118 later. If the difference of wheel acceleration value 114 and wheel acceleration value 130 in plateau phase 124 exceeds or does not reach differential wheel acceleration 126, calculated differential braking torque 112 may additionally be corrected, using a factor.

In one exemplary embodiment, braking torque 102 is increased very rapidly to an initial value 128 at the end of plateau phase 124, in the beginning of next build-up phase 108. Initial value 128 is selected in such a manner, that the wheel certainly does not yet lock, but a braking action is to be expected already. In this manner, a duration of build-up phase 108 may be shortened, and/or braking torque 102 may be increased, using a lower slope.

In other words, an algorithm for optimizing braking force with the aid of an instability controller is put forward.

An ABS controller of today is based on an instability regulation principle utilizing cyclically occurring pressure build-up, pressure-holding and pressure reduction phases. In this context, pressure is built up in the wheel until the maximum of the tire characteristic, that is, the p-slip characteristic, is exceeded and the wheel becomes unstable.

This ensures that the controller reacts robustly to changes in the coefficient of friction of the road and consequently detects the changes in the maximum transmittable braking force. Subsequently, the wheel is stabilized by a controlled reduction in pressure, before the next pressure build-up may be started.

The pressure reduction is intended to function at all possible coefficients of friction and to consequently ensure that the wheel does not lock.

Currently, the pressure reduction variable is applied to the corresponding vehicle in a complex manner. In this context, the challenge is to apply the pressure reduction in such a manner, that it functions reliably and ensures the wheel stabilization both in the build-up phase including sharp change in the normal force, at low vehicle speeds including marked slip dynamics, in response to disturbances including short-term changes in the coefficient of friction, and in the steady-state condition. This is rendered possible by selectively correcting an applied, basic reduction variable over additional application parameters and situation detection.

The model-based pressure reduction put forward here is adaptive, since it independently adapts to the situations described above. It may increase or decrease exclusively via the input variables. Thus, the new pressure reduction does not require any extensive application of the situations described and therefore includes markedly fewer application parameters.

If the wheel has been brought past the maximum of the adhesion characteristic, using an arbitrary pressure build-up gradient, then, in the approach put forward here, the pressure is reduced again as rapidly as possible to a level, at which the wheel stabilizes again. Since, in this context, the wheel dynamics are markedly greater than the vehicle dynamics, one may make a simplifying assumption, that substantially no change in the normal force takes place during the pressure reduction. In addition, the simplifying assumption is made, that after the pressure reduction, and consequently, on the pressure level, which is necessary for wheel stabilization, the same adhesion µ2 sets in, which was attained prior to the pressure reduction µ1.

For the purpose of clarification, the torque balance at the start of the pressure reduction is modeled in (1).

$$F_{x1}=1/R_{wheel}*(J_{wheel}*a_{x1}/R_{wheel}+Cp*p_{x1}) \quad (1)$$

where $F_{x1}$ is the braking force at the start of the pressure reduction;
$R_{wheel}$ is the rolling radius of the wheel;
$J_{wheel}$ is the mass moment of inertia of the wheel;
$a_{x1}$ is the acceleration at the start of the pressure reduction;
Cp is the braking coefficient (=wheel radius of the brake disk*surface area of the brake piston*coefficient of friction);
$p_{x1}$ is the brake pressure at the start of the pressure reduction.

The torque balance at the end of the pressure reduction is modeled in (2).

$$F_{x2}=1/R_{wheel}*(J_{wheel}*a_{x2}/R_{wheel}+Cp*p_{x2}) \quad (2)$$

where $F_{x2}$ is the braking force at the end of the pressure reduction;

$a_{x2}$ is the acceleration at the end of the pressure reduction; and $p_{x1}$ is the brake pressure at the end of the pressure reduction.

Given the assumptions just made, μ is constant and $F_N$ is constant, braking force $F_x$ remains constant, from which the following results $$F_{x1}=F_{x2} \quad (3)$$

If (1) and (2) are substituted into (3), and consequently, subtraction is carried out in accordance with the pressure, then the necessary pressure reduction step results in (4).

$$\Delta p \text{Reduction} = J_{wheel}/(R_{Wheel}*Cp)*(a_{x2}-a_{x1})*K \quad (4)$$

In this context, $J_{wheel}/(R_{wheel}*Cp)$ are vehicle parameters, and target wheel acceleration $a_{setpoint}=a_{x2}$ is the only application parameter. K is a correction factor, which may be increased or decreased as a function of the attainment of the target wheel acceleration.

A control cycle of an instability controller according to the approach put forward here is represented in FIG. 1. The wheel pressure characteristic is reflected in the upper part of the graph, and the corresponding $a_{wheel}$ characteristic is reflected in the lower graph.

In the steady-state condition of the ABS control system, in each control cycle, the re-acceleration of the wheel reaches the target wheel acceleration during the wheel stabilization, after the pressure reduction. The magnitude of the pressure reduction is increased with increasing wheel deceleration and reduced with decreasing wheel deceleration. The pressure reduction step adapts automatically in response to disturbances and changes in the coefficient of friction. There are fewer instances of subsequent pressure reduction. Subsequent reductions do not have a uniform pressure-step magnitude.

Finally, it should be pointed out that terms, such as "having," "including," etc., do not exclude any other elements or steps, and that terms, such as "a" or "an," do not exclude a plurality. Reference numerals are not to be regarded as a limitation.

What is claimed is:

1. A method for operating an antilock brake system of a vehicle, in which a braking torque at at least one wheel of the vehicle is cyclically controlled in at least build-up phases and reduction phases, to prevent locking of the wheel, the method comprising the following steps:
   in a first build-up phase, increasing the braking torque until a maximum adhesion at the wheel is exceeded;
   following the first build-up phase:
      in a first reduction phase that begins at an end of the first build-up phase, reducing the braking torque according to a first value of a factor by which a respective differential braking torque, which is achieved by the first reduction phase, is determined; and
      prior to a second build-up phase:
         measuring an actual wheel acceleration value of the wheel; and
         based on the measured actual wheel acceleration value of the wheel and a predefined target acceleration value for the wheel, setting a second value for the factor; and
      after the second build-up phase and based on the setting performed prior to the second build-up phase, reducing the braking torque in a second reduction according to the second value of the factor by which a respective differential braking torque, which is achieved by the second reduction phase, is determined.

2. The method as recited in claim 1, wherein a minimum value of a wheel acceleration characteristic of the wheel acquired after the first build-up phase and prior to the second reduction phase is used as the wheel acceleration value.

3. The method as recited in claim 1, wherein the wheel acceleration value is measured in response to passage of a predefined amount of time after a triggering time at which the first reduction phase is triggered.

4. The method as recited in claim 1, wherein the exceedance of the maximum adhesion is detected when a wheel acceleration gradient of the wheel is less than a limiting gradient for the wheel.

5. The method as recited in claim 1, wherein:
   in a plateau phase following the first reduction phase, the braking torque is held constant up to the second build-up phase;
   a wheel acceleration characteristic of the wheel is acquired at least during the plateau phase; and
   a factor for ascertaining the second value for the differential braking torque is increased when a maximum of the wheel acceleration characteristic is less than the target acceleration value.

6. The method as recited in claim 1, wherein:
   in a plateau phase following the first reduction phase, the braking torque is held constant up to the second build-up phase;
   a wheel acceleration characteristic of the wheel is acquired during the plateau phase; and
   a factor for ascertaining the second value for the differential braking torque is reduced when a maximum of the wheel acceleration characteristic is greater than the target acceleration value by more than a tolerance range.

7. The method as recited in claim 1, wherein the setting of the second value for the factor is performed based on a comparison of the measured actual wheel acceleration to the target acceleration value, the comparison being performed in a plateau phase that follows the first reduction phase, a braking pressure being reduced in the first reduction phase and being maintained in the plateau phase.

8. An antilock brake system for a vehicle, the antilock braking system being configured to cyclically control a braking torque at at least one wheel in at least build-up phases and reduction phases, to prevent locking of the wheel, the antilock braking system being configured to:
   in a first build-up phase, increase the braking torque until a maximum adhesion at the wheel is exceeded;
   following the first build-up phase:
      in a first reduction phase that begins at an end of the first build-up phase, reduce the braking torque according to a first value of a factor by which a respective differential braking torque, which is achieved by the first reduction phase, is determined; and
      prior to a second build-up phase:
         measure an actual wheel acceleration value of the wheel measured after the build-up phase; and
         based on the measured actual wheel acceleration value of the wheel and a predefined target acceleration value for the wheel, set a second value for the factor; and
   after the second build-up phase and based on the setting performed prior to the second build-up phase, reduce the braking torque in a second reduction according to the second value of the factor by which a respective differential braking torque, which is achieved by the second reduction phase, is determined.

9. A non-transitory machine-readable storage medium on which is stored a computer program for operating an antilock brake system of a vehicle, in which a braking torque at at least one wheel of the vehicle is cyclically controlled in at least build-up phases and reduction phases, to prevent locking of the wheel, the computer program, when executed by a computer, causing the computer to perform the following steps:
- in a first build-up phase, increasing the braking torque until a maximum adhesion at the wheel is exceeded;
- following the first build-up phase:
  - in a first reduction phase that begins at an end of the first build-up phase, reducing the braking torque according to a first value of a factor by which a respective differential braking torque, which is achieved by the first reduction phase, is determined; and
- prior to a second build-up phase:
  - measuring an actual wheel acceleration value of the wheel measured after the build-up phase; and
  - based on the measured actual wheel acceleration value of the wheel and a predefined target acceleration value for the wheel, setting a second value for the differential braking torque; and
- after the second build-up phase and based on the setting performed prior to the second build-up phase, reducing the braking torque in a second reduction according to the second value of the factor by which a respective differential braking torque, which is achieved by the second reduction phase, is determined.

* * * * *